Patented Jan. 4, 1938

2,104,295

UNITED STATES PATENT OFFICE 2,104,295

PROCESS FOR RECOVERY OF CALCIUM PHOSPHATE, ALUMINA AND POTASSIUM VALUES FROM THEIR INSOLUBLE MINERALS

Giuseppe de Varda, Serravalle Sesia, Italy

No Drawing. Application October 12, 1934, Serial No. 748,136. In Italy October 18, 1933

3 Claims. (Cl. 23—109)

Many processes are known which deal with the extraction of $K_2O$ and $Al_2O_3$ from potash bearing silicates, specially from leucite, wyomingite and similar rocks.

As a matter of fact the fertilizing action of the potash, when bound to the silica, is very poor.

Practically every means of extraction has been tried out like the heating of the mineral, fusions with chemicals, treatment in autoclaves, leaching with acids, etc. None of all these methods seems to obtain practical results.

They all require too many calories, or employ expensive chemicals, or give troubles with the extraction, or the separation of the dissolved elements is difficult, or the yields are too little in comparison with the cost of production, or they yield too many impurities, or the quality of the final products falls short of the necessary requirements.

All those particular defects may be summarized in one sentence. The various processes cannot be developed from the laboratory to the industrial stage because they are too expensive.

Since almost every available acid has been tried out in order to solubilize the potash and aluminum silicates even sulfuric acid as well as sulfurous acid have been suggested.

The chief trouble in the use of sulfuric acid is the difficulty of separating the dissolved K from the Al since alum usually crystallizes out.

Leaching with $H_2SO_3$, even a very finely ground leucite, gives too low a percentage in potash recovery. Subsequent leachings with a fresh portion of the same acid are almost ineffective. Besides the concentration of the dissolved potash is very low. To crystallize it out would require a tremendous amount of expensive calories.

As far as the phosphate rock is concerned the usual process consists in adding sulfuric acid to the mineral in order to transform the insoluble tricalciumphosphate into the very soluble monocalciumphosphate which has an excellent fertilizing action.

But the superphosphate thus formed contains only from 14 to 16 percent of valuable $P_2O_5$ and a large amount of calciumsulfate which is usually useless. This increases transportation and handling costs. The sulfuric acid required for the process (52 Bé.) is rather expensive too.

There are several patents which suggest the solubilization of the phosphate rock, with sulfurous acid in order to obtain by crystallization or precipitation some sort of a calcium phosphate soluble at least in very weak acids such as citric acid.

Chief troubles with these processes are as follows: The final product contains calciumsulfite which appears to render the product's suitability as a fertilizer at least doubtful.

The production cost is too high especially if other chemicals like $Ca(OH)_2$ or monocalciumphosphate or $Na_2SO_4$ etc. are to be added to the solution or if crystallization by the concentration of the leaching liquor is called for.

In my process a mixture containing a phosphorus bearing mineral (for instance phosphorite, apatite, etc.) and one or more potash bearing minerals (feldspars, glauconite, etc. but preferably leucite or wyomingite), the latter being very finely ground, is treated for several hours with a cold aqueous solution of sulphur dioxide ($SO_2$).

The leaching liquor may also contain a certain percentage of potassium sulfite or of other substances originating from the previous attacking cycles.

The duration of the leaching ranges from 3 to 6 hours and it is desirable to maintain the mass in continuous agitation and at a temperature between 1° and 20° C. Low temperatures give good results.

Thus almost the whole of the phosphorus and calcium and a considerable portion of the potassium and aluminum content of the minerals pass into solution. Also impurities such as iron, silica, etc. pass into solution.

The quantities and the concentration of the two acids used in the process (see below) vary considerably according to the quality (wyomingite or leucite, etc.) and percent composition of the various minerals, according to the percentage of the two minerals in the mixture, and according to the quality and quantity of the desired final products (potassiumphosphate instead of dicalciumphosphate plus some other potash salt, etc.).

If the mixture contains a very insoluble potassium mineral (feldspar, etc.) or if one aims at higher yields it will be convenient to leach the mixture with an acid of forced concentration containing 15% of $SO_2$ or more.

One prepares an acid solution of that kind starting from compressed $SO_2$ or straightaway from liquid sulphur dioxide. It is convenient that the partial pressure of the gaseous phase of the $SO_2$, once the equilibrium with the underlying acid liquid has been established, lies between 1.5 and 3 atm.

During the 1st attack of the mineral mixture by an acid of forced concentration, the total pressure to which the whole mass will be subjected should be kept at a value which is not too high. The best results will be obtained when the unfavorable effect, lower potash yields, etc., caused by an increase in the total pressure is counterbalanced by the favorable effect caused by the increase in the concentration of the sulfurous acid, this increase being brought about by the increase in the partial pressure of the gaseous phase of the acid.

If the attacking liquor had been subjected to forced concentration, its excess sulphur dioxide still uncombined after the leaching is conveniently recovered (for instance by aspiration and subsequent compression).

After this 1st attack, the leaching liquor $S_1$ is separated from the insoluble residue $R_1$ and another liquid, which we shall call secondary liquid $S_2$ is added to the first leaching liquor.

In order to obtain this secondary liquid $S_2$ the insoluble residue $R_1$ is treated, with hot dilute sulfuric acid and, generally, only in slight excess over the amount theoretically required to convert the values present into sulfates.

This residue $R_1$, made up by that part of the mineral mixture which is insoluble in sulfurous acid, still contains appreciable percentages of K and Al and small amounts of P as well, which are thus almost entirely recovered.

In order to illustrate better the mechanism of the basic chemical reactions and of the different chemical cycles involved in my process a flowsheet has been attached to the disclosure.

This flowsheet however should be considered nothing more than an example of one of the many ways of application of my process to plant production.

By no means should the attached flowsheet be constructed as a limitation of the field covered by my invention.

In the case of the example given in full lines in the flowsheet the secondary liquid ($S_2$) contains but little free sulfuric acid and a sufficient amount of soluble sulfates, chiefly of K and Al, to precipitate nearly all the lime dissolved during the 1st attack and present in $S_1$.

Probably a double exchange takes place between the calcium bisulphite and monocalciumphosphate of the main liquid $S_1$ on one side and the soluble sulfates plus the free sulfuric acid on the other side in secondary liquid $S_2$.

The calcium sulfate thus formed precipitates as gypsum which is sparingly soluble in water as well as in sulfurous acid leaving liquor $S_3$.

Operating correctly the quantity of $SO_4$ and Ca: ions that remains in solution become negligible. The solution will mainly contain phosphoric and sulfurous acid and sulfites (or bisulfites) of potassium and aluminum.

As an alternative method shown in dotted lines in the flowsheet in which only a single portion $M_1$ is used it is preferred to precipitate only that part of the lime which is in excess of the amount required for the subsequent formation of a dicalcium phosphate with the phosphoric acid of the solution.

When it is desired to reduce the consumption of the free sulfuric acid necessary in the secondary liquid $S_2$ and to reduce the amount of dissolved impurities of the main liquid $S_1$, a portion of the lime can be caused to precipitate by simply letting the said main solution rest. The said spontaneous oxidation and consequent precipitation may be improved by the addition of oxidizing agents (for instance oxygen, compressed air, etc.).

By this method the Ca values in the solution may be controlled so that sufficient Ca is present for the subsequent formation of the dicalcium phosphate. With reference to the flowsheet (dotted lines) the liquid $S_1$ is oxidized as described above and the precipitated gypsum is removed by decantation or filtration. The remaining liquid is represented by $S_4$ and is treated as described hereinafter.

The chief reasons one removes all or part of the lime are as follows:

To avoid the later precipitation of a tricalcium phosphate, whose fertilizing action is rather poor, or of an excess of calcium sulfate, or of a certain amount of calcium sulfite.

To restore to the attacking liquor ($S_3$ of the flowsheet) which may have to be used for a second or even third leaching at least a part of its original strength.

Referring to the first mentioned method wherein all of the lime is removed as gypsum, the liquor $S_3$ may be caused to absorb further gaseous $SO_2$, or it may be used such as it is, for a 2nd attack entirely similar to the 1st attack, on a fresh portion of the mixture of the minerals $M_2$ as indicated in the flowsheet.

After the 2nd attack the liquid ($S_4$) is separated by decantation or filtration from its insoluble residue ($R_2$).

Following up the example of the flowsheet, the liquid ($S_4$) after the 2nd attack, contains in solution amounts of lime and of phosphoric acid in the proportion required for the subsequent formation of a dicalcium phosphate.

In this case and in the assumption that it is desired to obtain this product—and not some other compound of phosphoric acid—no further removal of the excess lime by oxidation or by addition of soluble sulfates is required.

The residue $R_2$, very similar to $R_1$ is made up of that part of the portion $M_2$ of the mineral mixture which is insoluble in sulfurous acid.

Following the example of the flowsheet, the two residues $R_1$ and $R_2$ are mixed together and leached afterwards with hot diluted sulfuric acid in order to recover the remainders of the $K_2O$ and the $Al_2O_3$ which have not been dissolved during previous attacks with sulfurous acid. This forms the secondary liquid $S_2$ mentioned hereinbefore.

The main liquid ($S_4$), obtained by either of the above mentioned methods, is then slowly heated in order to remove approximately all the free and most of the combined $SO_2$ present in the solution.

Sulphur dioxide is almost insoluble in boiling water so that, according to the raise in temperature, gaseous $SO_2$ will free itself from the solution; this gaseous $SO_2$ will be cooled down and reabsorbed in order to be used in following cycles.

By suitably adjusting the following factors: concentrations, oxygen content, partial pressures of the sulphur dioxide and of the water vapour, heating velocity, temperature etc., an appreciable influence can be exercised on the whole process as well as on the quality and quantity of the final products.

Between approximately 70° and 90° C. the aluminum precipitates probably as aluminum hydroxide, and the phosphoric anhydride as dicalcium phosphate practically free from sulfites, and entirely soluble in ammonium citrate.

Since the precipitation of aluminum takes place at about 75° C. whereas the precipitation of the diphosphate starts at about 85° C., by the use of appropriate precautions it is possible to gather separately the two precipitation products.

The remaining liquid which, in addition to the potash, contains still in solution some small percentages of the various solubilized substances, may be conveniently reemployed after having been saturated with $SO_2$, for a new attack on a fresh lot of minerals, the above described cycle being repeated over again.

After all the aluminum present has been precipitated the solution may be placed in contact with ammonia under slight pressure. Thus a precipitation product of greater value may be obtained (for instance a mixture of calcium and ammonium phosphate).

Especially for economical reasons, it is convenient to wait till the the leaching liquor has been sufficiently enriched before proceeding to the separation of the potash.

The potassium sulfite of the solution originates from the combination of a strong base and a weak acid which by heating becomes still weaker.

According to the potassium salt desired, in many cases one has only to add to the potassium sulfite the desired acid radical either in the form of the acid (for instance $H_2SO_4$) or of a soluble salt, for instance $Ca(NO_3)_2$, thus decomposing the potassium sulfite.

In the first case gaseous $SO_2$ develops while in the second case an insoluble compound ($CaSO_3$) is formed which precipitates.

The solution will contain in the first case $K_2SO_4$ and in the second case $KNO_3$.

But many other potash compounds may be obtained quite easily from this potassium sulfite solution.

Generally it will be convenient to work in hot conditions especially when $SO_2$ is developed.

There remains in solution only the potassium salt whose production is desired. This salt can be readily recovered either by crystallization or by complete evaporation of the solution.

Also in the case of the potash, as we have already seen from the gypsum, oxidizing agents may be resorted to instead of adding the desired acid radicals in the form of free acids or their soluble salts, thus completing the spontaneous oxidation of the extremely soluble potassium sulfite to potassium sulfate which is much less soluble, especially in cold water.

Sometimes during the various stages of the described process, additions of measured amounts of calcium carbonate or sulfuric acid may be necessary for correctional purposes, for instance when the lime content of the liquors in operation needs some final adjustment of the molecular ratio $CaO:P_2O_5$ as indicated in the flowsheet.

In order to remove the impurities that have passed into solution, such as Si, Fe, Mg, etc., and in order to facilitate the separation of the leaching liquor from the respective insoluble residues, one may cause the precipitation of some gypsum by adding small amounts of the secondary liquid ($S_2$) to the main liquid at the end of the 1st and of the 2nd attack, that is either to $S_1$ or $S_4$.

But within the field of my invention other flowsheets may be laid out which achieve satisfactory results in plant production.

For instance if the leaching has been performed with sulfurous acid at forced concentration (containing more than about 15% of $SO_2$) in many cases it will not be necessary to divide the mixture into portions and consequently to restore, at least partially, the strength of the acid liquor before one may start the leaching of a new portion.

In fact, only when the leaching is performed at normal pressure, the drawback of the low concentration of the sulfurous acid in the leaching liquor occurs, since under these conditions the acid will usually contain only from 6 to 8% or even less of dissolved $SO_2$.

This results in a very low concentration of the dissolved K and P especially since the greater portion of the existing acid combines with the lime to form a calcium-bisulfite.

In this case, in order to reduce production cost, it is necessary at least to double the concentration of the dissolved K and P which may be achieved by dividing the mineral mixture, which has to be treated, in two or more portions (see flowsheet).

Having now particularly described and ascertained the nature of my said invention and in what manner the same is to be performed, I declared that what I claim is:—

1. Process of solubilization and recovery of potassium, aluminum and phosphorous values from a phosphate rock-leucite or from a similar mineral mixture leached with an aqueous solution of sulfurous acid of which the lime in excess of the amount required for the formation of a dicalcium phosphate has been eliminated in the form of gypsum which comprises the separation of the dissolved alumina from the phosphorous and potassium values by heating the solution first to about 75° C. at which temperature the precipitation of the alumina takes place, separating the precipitated aluminum compound from the hot solution and then slowly increasing the temperature to about 90° C., whereby the precipitation of a dicalcium phosphate practically free of sulfite and soluble in ammonium citrate is brought about.

2. Process for the manufacture of potassium sulfite, dicalcium phosphate, aluminum hydroxide and calcium sulfate from phosphorous containing minerals and potash bearing silicates which comprises treating a finely ground mixture of said minerals with cold sulfurous acid, separating the main solution thus obtained from the insoluble residue, digesting said residue with dilute sulfuric acid, adding this new solution which contains chiefly $K_2SO_4$, $Al_2(SO_4)_3$ and a little free sulfuric acid to the main solution, in order to cause the precipitation of the calcium values, in excess of the amount required for the formation of the dicalcium phosphate, and of the impurities, separating the precipitated calcium sulfate from the acid solution, separating the aluminum values from the phosphorous and potassium values by heating the solution slowly in order to drive off the $SO_2$ and precipitate the dissolved alumina, separating the precipitated aluminum compound from the hot solution, further heating the solution at a higher temperature until most of the phosphorous has precipitated as a sulfite free dicalcium phosphate, and eventually separating said phosphate from the solution which contains the potassium mostly in the form of potassium sulfite.

3. Process for solubilization and recovery of the phosphorous, calcium, potassium and aluminum values from a phosphate rock-leucite or from a similar mineral mixture, leached with sulfurous acid and thereafter with sulfuric acid, based on cyclically closed and partly reversible chemical reactions between sulfates and sulfites and the corresponding acids as well, which comprises solubilizing the calcium and part of the potassium and aluminum content of the minerals as sulfites and the residual part of the potassium and aluminum content as sulfates, by attacking the mineral mixture with sulfurous acid and successively leaching the mineral residue with dilute sulfuric acid, transforming the soluble sulfates thus obtained from said residue into soluble sulfites by adding those sulfates together with some free $H_2SO_4$ to the liquid containing the sulfites, thus changing at least part of the dissolved calciumdisulfite into the corresponding insoluble sulfate, separating said insoluble sulfate, heating the solution in order to drive off most of the $SO_2$ originally present and thereby precipitate the aluminum and phosphorous values and then eliminating them from the final solution which contains the potassium values mostly in the form of potassium sulfite.

GIUSEPPE DE VARDA.

CERTIFICATE OF CORRECTION.

Patent No. 2,104,295. January 4, 1938.

GIUSEPPE de VARDA.

It is hereby certified that error appears in the above numbered patent requiring correction as follows: In the heading to the printed specification, line 7, strike out the words and period "No drawing."; and insert the following flow sheet as a part of the patent -

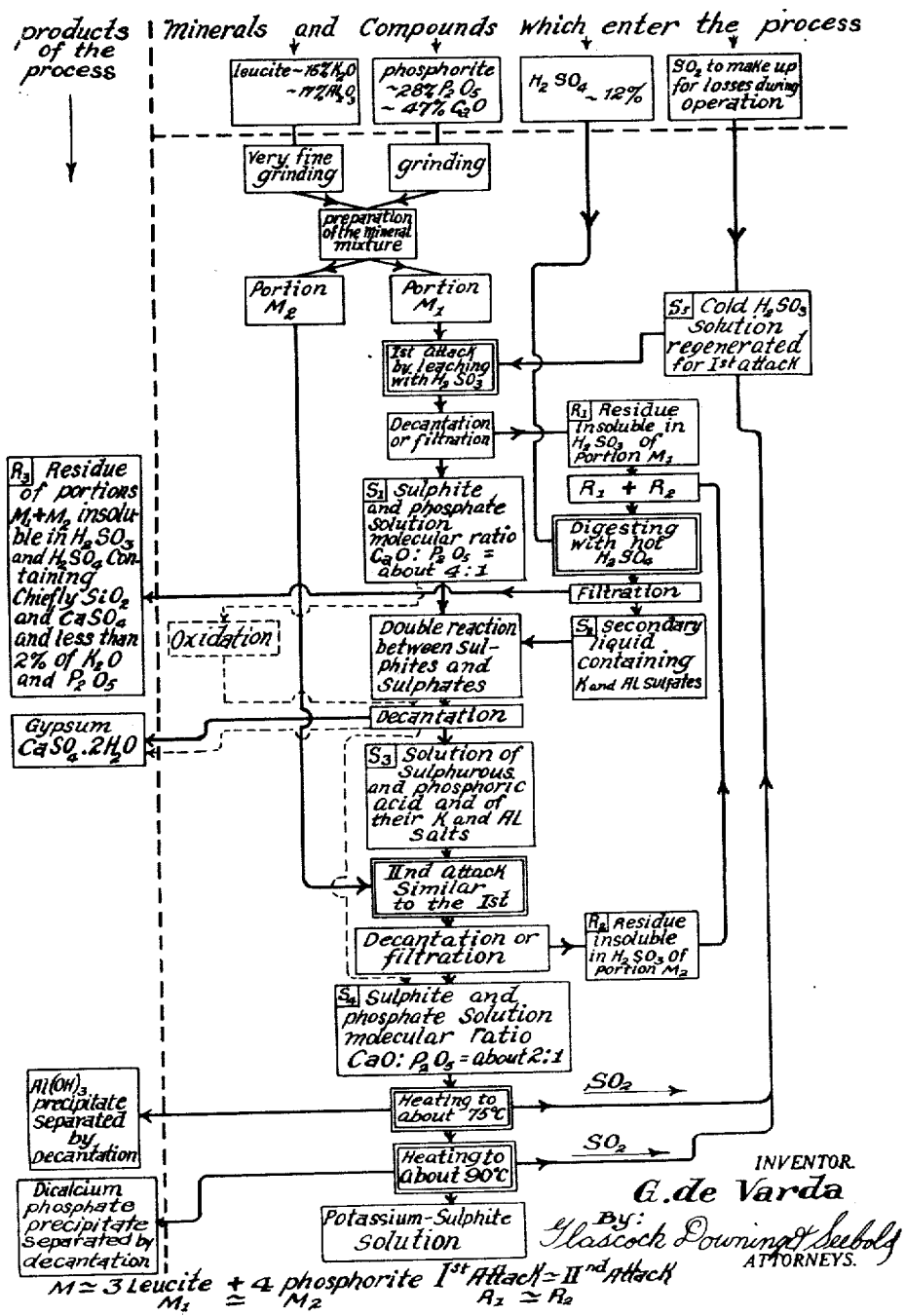

and that the said Letters Patent should be read with these corrections therein that the same may conform to the record of the case in the Patent Office.

Signed and sealed this 3d day of May, A. D. 1938.

Henry Van Arsdale,